United States Patent

Pall

[15] 3,690,606
[45] Sept. 12, 1972

[54] ANISOMETRIC COMPRESSED AND BONDED MULTILAYER KNITTED WIRE MESH COMPOSITES

[72] Inventor: David B. Pall, Roslyn Estates, N.Y.
[73] Assignee: Pall Corporation, Glen Cove, N.Y.
[22] Filed: May 27, 1968
[21] Appl. No.: 732,443

[52] U.S. Cl. ................. 245/1, 29/163.5, 29/182.2, 210/510, 55/526
[51] Int. Cl. ........................................... B22f 7/02
[58] Field of Search ............ 245/1, 5, 2, 3, 4, 6, 7, 8, 245/9, 10; 55/525, 522, 526, 527, 528, 500, 505, 510, 381, 382, 486–489, 481, 498; 29/194, 182.2, 182.3, 182.5; 66/196, 202, 170; 210/493, 499, 510

[56] References Cited

UNITED STATES PATENTS

| | | | |
|---|---|---|---|
| 2,829,733 | 4/1958 | Bartels et al. | 55/526 |
| 3,017,698 | 1/1962 | Hambrecht et al. | 55/526 |
| 3,049,796 | 8/1962 | Pall | 29/183.5 |
| 2,327,184 | 8/1943 | Goodloe | 29/163.5 |
| 3,061,912 | 11/1962 | Kalil | 29/163.5 |
| 3,241,681 | 3/1966 | Pall | 210/493 |
| 3,437,457 | 4/1969 | Fisher | 29/182.2 |
| 3,504,422 | 4/1970 | Thalman | 29/163.5 |
| 1,676,191 | 7/1928 | Jordahl | 55/526 |
| 2,274,684 | 3/1942 | Goodloe | 55/525 |

*Primary Examiner*—Richard J. Herbst
*Attorney*—Janes & Chapman, John R. Janes, Leland L. Chapman, Barry G. Magidoff, Burton Rodney and Marvin B. Rosenberg

[57] ABSTRACT

Anisometric compressed and bonded knitted wire mesh composites are provided which comprise a plurality of sheets of knitted wire mesh, superimposed at random orientation with respect to each other, compressed or densified to a voids volume within the range from about 10 to about 90 percent, and bonded together. The sheets are taken in sufficient number, usually at least five and preferably 10 or more, and as much as 1,000 or more, to form a self-supporting relatively non-resilient composite of high tensile strength and high breaking strength having an average pore diameter of less than 200 microns, and preferably less than 100 microns, that is relatively uniform in any unit area of the surface, and having an anisometric porosity, the through pores extending crosswise of the sheet greatly exceeding in number the through pores extending laterally of the sheet, which latter pores can be reduced virtually to zero in a highly compressed composite.

The composite is formed by superimposing a plurality of knitted wire mesh sheets, annealing the composite to avoid wire breakage during later processing, compressing the composite to the desired density and anisometricity by application of pressure in a direction approximately perpendicular to the plane of the layers of the composite, and bonding the sheet layers and the wire filaments of the sheets together at their points of contact and/or crossing. The bonding holds the composite at the selected density, prevents relative movement of the wires in the composite, and in conjunction with the multilayer structure imparts the self-supporting nonresilient characteristic, together with high tensile strength and high breaking strength.

14 Claims, 26 Drawing Figures

PATENTED SEP 12 1972

ANISOMETRIC COMPRESSED AND BONDED MULTILAYER KNITTED WIRE MESH COMPOSITES

This invention relates to compressed and bonded anisometric multilayer knitted wire mesh composites, particularly useful as filter elements for liquids, and as acoustic material, and more particularly to anisometric knitted wire mesh composites formed of a plurality of knitted metallic filaments, compressed and bonded together, preferably by controlled interrelated compressing and sintering operations.

Woven wire mesh have been in use for some years as filter materials. They have the advantages of being readily available, permitting close control of uniformity in the number, size and shape of the pores, and in tensile strength, as well as being adapted for fabrication and being relatively low in cost. Various forms of such materials have been provided, ranging from the woven wire mesh as commercially available, to wire mesh specially treated so as to better suit them for filter uses.

U.S. Pat. No. 2,423,547 to Behlen, dated July 8, 1947, suggests rolling a wire mesh to form a flat sheet, and thereby produce a filter or screen material having a reasonably smooth surface, analogous to a perforated sheet material prepared by drilling holes in a metallic sheet in the desired pattern. However, such screens have the disadvantage that the dirt capacity is very greatly reduced, as compared to the woven wire mesh starting material.

The amount of dirt that can be taken up by a filter before it is effectively clogged is referred to as the dirt capacity of the filter, and this can be measured in various ways. For reference purposes, it is usually expressed in terms of grams of standardized dirt per unit surface area of the filter, as determined by a standardized test procedure.

U.S. Pats. Nos. 2,925,650 and 3,049,796 to Pall describe and claim woven wire sheet material specially treated by sinter-bonding, with a slight or great deformation of the wires at their points of crossing, which possess several advantages over the Behlen material. Not only are the wires held against a relative shift in position during treatment, because of the sintering operation, but the material also retains much of the nature of the starting wire mesh, and therefore much if not all of the original dirt capacity.

Nonetheless, one of the difficulties in using woven wire mesh-type filters is their relatively low dirt capacity, as compared to other filter materials.

Filter media can generally be classified as being one of two types, depth filters and surface filters. A depth filter removes suspended material from the fluid passed through the filter by collecting it not only on the surface of the element but also within the pores. A depth filter has a considerable thickness, and has a plurality of pores of distinct length. The longer the pores, the higher the dirt capacity of the filter, because there is more room for dirt along the pores. Most depth filters are made of masses of fibers, or other particulate material, held together by mechanical means or by bonding. One or several layers of such materials can be employed, and these layers can vary in porosity. In most cases, however, the greater percentage of contaminants unable to pass through the filter is trapped at the surface of the filter.

A surface filter removes suspended material from the fluid passed through the filter by collecting such material on its surface, and the material thus removed forms a filter cake or bed upon the filter. This material naturally obstructs the openings in the surface of the filter, because the fluid must flow through this material, which thus effectively reduces the diameter of the filter openings to the size of the pores in the filter cake. This reduction in effective diameter of pore openings in the filter increases the pressure differential required to maintain flow through the filter.

Woven wire mesh filters of the square weave type fall in the category of surface filters, because the depth of the pores through the sheet is substantially no greater than the diameter of the filaments making up the weave. Consequently, these filters have a rather limited dirt capacity, as compared to depth filters. U.S. Pat. No. 3,327,866 to Pall et al. describes woven wire mesh which, by an appropriate selection of wire size and wire count, in both warp and shute, is formulated to specified pore size Dutch twill weaves of extraordinarily high dirt capacity, as compared to Dutch twill weave wire mesh woven of wires of other sizes and/or counts.

Knitted wire mesh filter elements have been known for many years. However, the physical properties of knitted mesh made of fine diameter wires are such as to defy any modification previously attempted to render them suitable as filters for anything other than coarse filtration of liquids and gases, such as air, since they have lacked a reliable pore size uniformity and their maximum pore size has been rather high, well in excess of 200 microns.

A number of patents have described air filters made, in whole or in part of knitted wire mesh, among them, No. 1,676,191 to Jordahl, No. 1,905,160 to De Angelis, No. 1,829,401 to Kamrath, No. 2,274,684 to Goodloe, No. 2,327,184 to Goodloe, No. 2,334,263 to Hartwell, No. 2,439,424 to Goodloe et al., No. 2,462,316 to Goodloe, No. 2,672,214 to Goodloe, No. 2,792,075 to McBride et al., No. 2,929,464 to Sprouse, and No. 3,085,381 to Sobeck. Virtually all of the filter elements thus proposed comprise a plurality of layers of knitted wire mesh. However, the problem presented by knitted mesh is best summarized by Goodloe in No. 2,327,184:

"Although it is highly desirable from the standpoint of efficiency to employ layers of fine mesh, such fine mesh, especially when of knitted character, is generally of flimsy character, is not self-sustaining, and consequently a filter body composed of layers thereof is easily subject to compression by the force of the air or gas stream moving therethrough, whereby tendency to crowd the layers together is increased, so that the undesirable conditions above referred to are further enhanced."

Goodloe and the other workers in the field have resolved these problems as best they could, using reinforcing spacers (as in No. 2,327,184), by crushing or compacting the plural layers endwise or crosswise (as in No. 2,439,424, No. 2,462,316 and No. 2,672,214) or by supporting them within a filter unit frame (as in No. 1,676,191, No. 1,829,401, No. 2,792,075, No. 2,929,464 and No. 3,085,381). Such expedients are acceptable for gas filters, but they are not capable of overcoming the flimsy, nonself-supporting nature of knitted wire mesh to render them suitable for liquid filtration, where the fluid pressures are considerably higher, and where high strength combined with low or minimal flow resistance are indispensable prerequisites.

One of the outstanding characteristics of a knitted material, as opposed to a woven material, is its resiliency or low modulus of elasticity (Young's Modulus). A knitted wire mesh can be stretched over 100 percent in any direction, despite the nonresiliency of the wire filaments of which it is made up. In an air filter, this inherent resiliency (which is due to the looping of the filaments in the knit weave) is an advantage, as Jordahl pointed out, in No. 1,670,191, and it also makes it possible to fold and crush the material in any direction, as in Nos. 2,439,424 and 2,462,316. In a liquid filter, however, this resiliency is a disadvantage, since it means, in effect, that pore size varies with pressure drop across the filter, the pores of the material closing as the pressure drop increases.

It is equally evident that if the filaments be locked in position, by bonding or other means, the resiliency is not diminished appreciably, because the looped condition of the filaments is unaffected by the bonding. Indeed, Jordahl pointed out that even when a plurality of layers of knitted mesh are superimposed, and compressed to any desired density, a relatively great density "may be obtained without danger of losing the characteristic indicia of the structure above described, since the uneven or irregularly roughed surfaces of the fabric, due to the multiplicity of interlocked strand loops distributed thereover, will always tend to produce sufficient separation of the component folds, sheets or layers as to assure the requisite low air pressure resistance of the structure." It was because of this that Goodloe in No. 2,274,684 used comparatively stiff wire, "whereby the interengaged loops forming the fabric tend to resist relative displacement and consequently tend to retain and maintain the initial shapes and uniform distribution of the loop defined openings throughout the area of the fabric, as well as a considerable degree of self-supporting stability due to inherently greater resistance to both contraction and elongative stretch of the fabric;". Because of these difficulties, which are not found in woven wire mesh, and because knitted wire mesh presents no apparent advantage over woven wire mesh, whether in one or in several layers, knitted wire mesh has not been preferred to woven wire mesh in liquid filters.

In accordance with the invention, knitted wire mesh is formed into a self-supporting relatively rigid anisometric multilayer structure that is not only eminently suited for use in liquid filtration, as well as other uses, such as in gas filtration, and in acoustic absorption, but also has unexpected and advantageous properties as compared to similar materials made of woven mesh. The knitted mesh material of the invention has lower flow resistance than comparable woven mesh material of the same pore size, and it is also stronger, is more uniform in permeability, has a higher modulus of elasticity (Young's Modulus), usually at least 3.3 percent of the modulus of solid sheet of the same material, and frequently much higher, and when materials of equal particle removal are compared, has a higher dirt capacity. For stainless steel this value is at least $1 \times 10^6$ psi. Why this is so is not at present understood, and no explanation thereof can be offered, but the superiority is clearly to be seen in the data that has been collected, of which a representative selection is given in the examples.

The knitted wire mesh of the invention comprises a plurality of sheets of knitted wire mesh, superimposed at random orientation with respect to each other, compressed or densified to a voids volume within the range from about 10 to about 90 percent, and bonded together. The sheets are taken in sufficient number, usually at least five and preferably 10 or more, and as many as 50 to 1,000 or more, to form a self-supporting relatively nonresilient anisometric composite sheet of high tensile strength, high specific strength and a high modulus of elasticity, having an average pore diameter of less than 200 microns, and preferably less than 100 microns, that is relatively uniform in any unit area surface of the sheet. The porosity of the composite is anisometric, the number of through pores extending across the sheet exceeding the number of through pores extending laterally of the sheet. The number of lateral through pores can be reduced virtually to zero, if the degree of compression or densification is great enough, and this can be an advantage in many uses. The thickness need not be great, provided the sheet is self-supporting, and preferably is within the range from about 0.001 to about 0.5 inch.

The composite is formed, in the process of the invention, by superimposing a plurality of knitted wire mesh sheets, preferably (but optionally) annealing the composite to avoid wire breakage during later processing, compressing the composite to the desired density by application of pressure in a direction approximately perpendicular to the plane of the layers of the composite, and bonding the sheet layers and the wire filaments of the sheets together at their points of contact and/or crossing.

The annealing softens the wires which are work hardened as a result of the knitting operation, and permits them to bend or deform during compression without breaking. While it is preferable to anneal the composite to reduce annealing cost, annealing of the knit mesh sheets before they are superimposed into a composite is an equivalent step, serving the same purpose.

If the composition of the wire is such that very little work hardening occurs during knitting, the annealing step may be omitted.

The bonding holds the composite at the selected density, prevents relative movement of the wires in the composite, and in conjunction with the multilayer structure imparts the high modulus of elasticity, usually at least $1.1 \times 10^6$ psi., together with high tensile strength and high specific strength.

In a preferred embodiment of the invention, the filaments of the knitted wire mesh are sintered to integrate them, at the bonding stage of the process. The filaments can be integrated by sintering prior to compressing, so that they no longer are able to shift their relative positions. The sintering process also anneals the filaments. However, since in the stack of knitted mesh sheets the wires are sufficiently stable against relative movement during compressing, being held in position by the interlocked loops of wires of adjacent sheets, they may be compressed, preferably by rolling, before sintering.

The rolling and sintering can be repeated as many times as desired to meet any desired porosity and density requirement. In certain cases, the effect of a rolling operation can be imparted to the work by the application of pressure during sintering.

This method of the invention makes it practical to prepare composite sheet products from knitted mesh sheets formed of very fine wires, appreciably finer than 10 mils in diameter. In fact, wires 2 to 4 mils and smaller in diameter can be utilized in the process of the invention to provide strong self-supporting relatively nonresilient anisometric knitted very thin multilayer composite sheet products having a relatively large number of pores in a uniform pattern, and a uniform porosity across but not laterally of the sheet.

This high voids volume, strength, good particle removal rating, and anisometrically disposed uniform pore characteristics of the knitted wire mesh composites of the invention also render them particularly useful as acoustic absorption media, and especially as the surfacing material controlling access to sound damping chambers, in absorption-type acoustic insulation. Such insulation is designed to serve as the lining for gas conduits, such as in ventilation conduits or ducts, and in gas passages and ducts of jet aircraft, and includes a surfacing material of a porous nature, controlling access to laterally extending chambers which are dimensioned to damp or attenuate sound waves of the selected wavelengths and which may or may not contain sound absorbing material. The knitted wire mesh composites of the invention are superior to perforated metal sheets, sintered woven wire mesh, and sintered non-woven wire mats of comparable pore size and thickness, as the surfacing material in such insulation.

The anisometric knitted wire mesh composites are also susceptible of being made with a relatively low voids volume, using knitted mesh of relatively large wires and small pores, and a relatively high thickness, so that they are especially suited for use in transpiration cooling, when they can serve as porous walls or wall liners for passage of cooling gases to efficiently remove heat from the chamber walls, as in jet engine combustion chambers, rocket engine fuel injection systems, turbo-jet blades, and the surface skin of hypersonic aircraft, reentry and aerospace craft, and other space vehicles and projectiles.

By use of the knitted mesh composites of the invention, it is possible to make porous sheets from wire materials which cannot be woven into suitable wire mesh. If a wire mesh is not to be too sleazy (i.e. if the wires are not to be free to slide around), the wires must be elongated and deformed to small radius during weaving. The most common woven meshes (e.g. 325 × 325 × 0.0014, 200 × 200 × 0.0021) require wire with an elongation of at least 25 percent, and very few weaves can be made from wires having elongations of less than 15 percent. By contrast, wire materials with very low elongations can be knitted, and then used to make the composites of the invention.

Several knitted wire mesh composites, and filter elements and acoustic insulation containing the same, all in accordance with the invention, are described in detail below, having reference to the embodiments shown in the accompanying drawings, in which.

Figure 1:
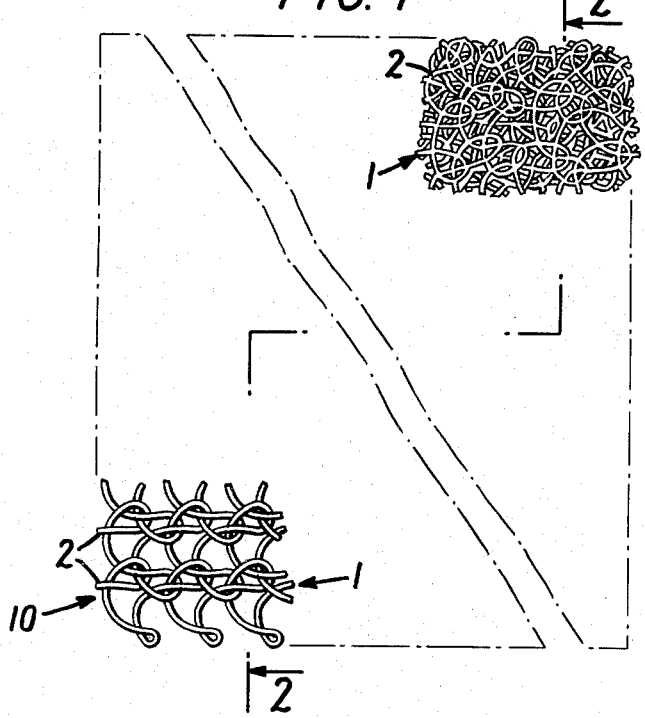
FIG. 1 is a plan view of a rigid warp-knitted mesh composite, showing in two parts the starting mesh and the composite, respectively.

A knitted mesh is composed of rows of loops, each caught into the previous row, and depending for its support on both the row above and the row below. There are two types of knitting, weft and warp. In weft-knit mesh the loops run crosswise of the fabric, and each loop is linked into the loop on the preceding row. In warp-knit mesh, parallel yarns are united in a chain stitch, first one yarn and then the other zig-zagging to tie the yarns together; and the loops interlock both weftwise and warpwise in the fabric. Warp-knitted mesh has about four times as many stitches to the inch as weft-knit mesh, and is of a stronger and closer construction.

When knitted mesh layers are superimposed, at random, the pores of adjacent mesh layers do not necessarily line up, because the mesh have an uneven surface, with projecting loops, resulting in relative displacement of adjacent mesh layers. Upon compression of the composite in a direction perpendicular to the plane of the mesh, this displacement may be increased. Thus, because of the random orientation of the mesh layers of the composite, the through pores follow an extremely tortuous path. At the same time, the anisometric characteristic is impressed on the sheet, because of the relative lateral displacement of the fibers of adjacent mesh layers, to selectively block laterally extending through pores.

This relative displacement is consequently an advantage, since it has the effect of reducing the size of the through pores in the composite. Loops of adjacent mesh layers project into and partially obstruct the pores of the next adjacent layers, and upon compression this effect can be repeated many times, with loop wires from layers as far as three or four layers away joining in this obstruction. Thus, in a composite of five to 10 layers, through crosswise pores can be reduced to as low as an average of 50 microns or less, using mesh having an initial 500 to 10,000 micron pore size.

At the same time, these projecting loops selectively block the laterally-extending through pores to a greater extent than the crosswise pores, and this effect is increased as the number of layers and the degree of compression or densification is increased.

The result is an accentuation of the anisometricity of the starting knitted mesh, to the point where the through pores that extend laterally can be blocked altogether, and thereby extinguished.

The tortuousness of the through pores in these composites is in contrast to the pores through a woven wire mesh, such as a square weave mesh, which are of the straight-through variety, or of a Dutch twill weave material, which are angled.

The knitted wire mesh composites of the invention can be made up of warp-knitted or weft-knitted wire mesh in any combination of mesh, wires, pore sizes, and knit types and stitches, such as plain stitch or purl stitch, flat stitch or rib stitch, open work stitch or tuck stitch, weft-knit mesh; and single-bar tricot, double bar tricot and Milanese warp-knit mesh. Flat knit and circular knit mesh can be used. Circular knit mesh can be cut open, or used double.

The knitted mesh composites of the invention can be knitted of wires of any metal. For filter and acoustic uses, metals which are inert to and non-corroded by the fluid being filtered or the gas in contact therewith are of course preferred. Stainless steel is a very suitable material. Aluminum, brass and bronze wires can also be used. Other wires that are useful include copper, iron, steel, Monel metal, molybdenum, tantalum, colombium, titanium, tungsten, nickel-chromium alloys, cobalt-based alloys, chromium-plated wires of all types, zinc-plated wires of all types, and cadmium-plated wires of all types. All of these wires give knitted mesh composites of high modulus of elasticity, usually at least 3.3 percent of the modulus of solid sheet of the same material, because of the construction of the composite.

These can be knitted using conventional textile knitting machinery to mesh of the required needle ends, or loops per inch, wire diameters, and pore sizes. In general, the mesh should not have more than about 30 needle ends per inch, but there is no lower limit. If the knitted mesh is rather open, i.e., if the needle ends are only 2 per inch, or less, more layers may be needed to reduce pore size to the desired maximum than if closer knitted mesh is used, but if large initial thickness of the composite is not a factor, this is not a disadvantage.

The wires are usually monofilaments. Wires less than 10 mils in diameter, and preferably from 1 to 5 mils in diameter, are preferred for filter uses. The wires can be of any cross-sectional configuration, such as round, square, flat, polygonal, elliptical and rectangular. Stranded multifilament wire can be used.

It is sometimes advantageous for some filter uses to use magnetic wires, or to interleave mesh of magnetic wires with mesh of non-magnetic wires, in the mesh composites of the invention. In some cases, it may be useful to alternate mesh of magnetic wires with mesh of non-magnetic wires.

The composite of the invention is prepared by superimposing a selected number of knitted wire mesh sheets, one above the other. The orientation is random, preferably, since this best enables each sheet to remedy any nonuniformity in the next sheet, and produce a composite that is uniform throughout, but an orderly or a patterned orientation, such as laying alternate sheets at right angles, or other specific orientation, to the one below may have advantages in some instances.

If the knitted wire mesh have not previously been annealed, the composite is preferably annealed first, to soften the wire filaments. This is especially desirable when the wire filaments are 4 mils or less in diameter. Annealing is at a temperature and for a time appropriate for the metal of which the filaments are made, and is usually at from about 150° to about 1,125°C. for from ten minutes to 48 hours. The following are exemplary:

| Metal | Temperature (°C.) | Time (Minutes) |
| --- | --- | --- |
| Stainless steel | 1000–1125 | 10–30 |
| Copper | 260–650 | 10–30 |
| Steel | 810–875 | 10–30 |
| Monel | 875–1000 | 10–30 |
| Aluminum | 350–415 | 10–180 |

After annealing, the composite is compressed. The compression can be in a single step, or in several steps. If several steps are used, the composite is preferably bonded after the first compression, and then rebonded after each succeeding compression step. The degree of compression at the final step then is determined by the desired density or voids volume, and pore size.

The compression is applied perpendicularly to the plane of the layers of the composite, or approximately perpendicularly, but not more than 10° from the perpendicular, since the displacement component may be excessive at such larger angles. The compression can be applied with restraint, as in a mold, but it is preferably without restraint, as by platens, or by pressure rollers. Rolling is preferred.

The composite should be subjected to a pressure of the order of 100 to 200,000 lbs. per square inch, the pressure applied depending upon the ductility of the metal, and applied normal to the metal surface, as by rolling or coining. If the pressure is less than the deforming pressure for the metal of the wires, usually about 50,000 lbs. per square inch, it merely results in densification of the composite, by forcing the layers and the wires closer together.

If the pressure applied is sufficiently great, a coining action can be obtained, in which the composite is compressed to as little as about 10 percent of the starting thickness. Reductions of as little as 30 percent in the starting thickness can be sufficient, however, and preferably the reduction is to from about 30 percent to about 65 percent of the starting thickness.

After compression, the layers and the filaments are set in their new relative positions by bonding them together at their points of contact. The layers and filaments can if desired be bonded by welding, brazing, soldering or sintering, or by use of resinous bonding agents, applied as solutions, dispersions, or from a fluidized bed of the resin. They will, of course, be mechanically interlinked or interleaved or interlocked, as a result of the compression, so that a very strong structure results.

Brazing, soldering, resin bonding and welding, while fully satisfactory, may reduce porosity and pore size to an undesirable extent. Consequently, it is frequently preferred to integrate the filaments at their points of contact by sintering.

The composite can be sintered by passing it through a furnace in a non-oxidizing atmosphere, such as, for example, in a reducing atmosphere of hydrogen or carbon monoxide, or mixtures thereof; or in an inert atmosphere such as nitrogen, argon, helium, or combinations thereof; or in a vacuum. The mesh is heated to a temperature not exceeding approximately 20° below the melting point of the metal of which the filaments are formed. Generally, the temperature will be in excess of 1,000°F. The result is a sintered integration of the metal at the points of crossing.

After bonding has been effected, the composite can be compressed again, such as by rolling, and then bonded again, such as by sintering, and these steps can be repeated as many times as necessary to give a composite having the desired characteristics, for filtration, for acoustic insulation, or for other uses. The final composite generally will have been reduced to between about 10 percent and about 95 percent of the starting thickness, and the pore anisometricity will be such that the permeability for flow through the pores extending laterally will be less than about 75 percent of that for flow through the pores extending across the sheet, and preferably less than 60 percent, and this can be reduced to zero. The permeability is defined as the volume of flow of any fluid at unit differential pressure through a unit cube.

As one or several of the juxtaposed layers there can also be used woven wire mesh, or metal plates or sheets, which can be perforated or imperforate, and which can be at the surfaces or in the interior, and which can be bonded thereto by any of the procedures indicated above. The combination of the knitted wire mesh composite with a perforated material is particularly useful, as it permits the manufacture of light weight high strength materials, useful in sound absorption in airborne applications. A layer of metal powder can be dusted into the knitted wire mesh composite, or superposed on one or both surfaces thereof, and bonded thereto, for example in accordance with U.S. Pat. No. 3,017,917, dated Nov. 6, 1962.

If desired, the knitted mesh wire composites of the invention can also be laminated to other materials, such as woven wire mesh, and metal plates and sheets, perforated, if desired.

The knitted wire mesh composite can also be impregnated and/or coated with fibrous material such as inorganic, metallic or organic fibers, as disclosed for instance in U.S. Pats. Nos. 3,158,532; 3,238,056; 3,246,767 and 3,353,682.

After bonding has been effected, the composite can be formed into filter elements of any desired form or configuration, with or without a support. The composite can be set in the desired configuration by corrugating, folding, or other shaping techniques, following which it can be put into the form of a filter element, as, for example, by folding a corrugated sheet into a cylindrical form, lapping over the free ends of the sheet, and bonding them together to complete the cylinder. This cylinder can be end-capped, if desired. The result is a rigid structure in which the knitted wire mesh composite serves as the filtering sheet. The knitted wire mesh composite is quite resistant to deformation or distortion, under rather high liquid pressures. The preceding is given merely as an example. It will be apparent that any desired configuration can be adopted.

A structure particularly useful in acoustic insulation is a honeycomb in which a knitted mesh composite of the invention forms one face, and the other face is a porous or nonporous material such as another of the same knitted mesh composite, woven wire mesh, perforated sheet, or imperforate sheet. The two faces enclose the cellular honeycomb core structure, made up of cross walls extending between the faces. These cross walls are nonporous, or imperforate, usually, but they can be porous, as well. Such a structure can include one or more internal faces or dividers, which can be bonded to the honeycomb core by any of the procedures described above. However, procedures which do not cause substantial blockage of the open area of the knitted mesh composite are preferred, such as sintering.

Figure 2:
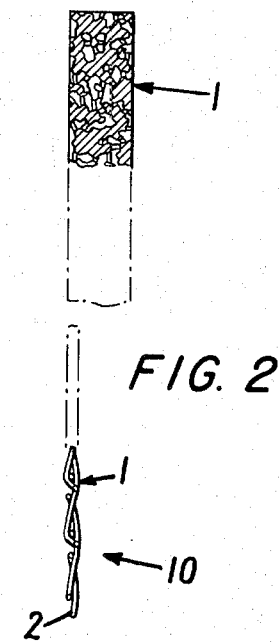
FIG. 2 is a view in transverse section taken along the line 2—2 of FIG. 1, and looking in the direction of the arrows.

FIGS. 1 and 2 show an anisometric knitted wire mesh composite of the invention, made up of 10 layers 1 of a warp-type single-bar tricot knitted wire mesh, 12 needle ends per inch, of 4 mil stainless steel wire 2, rolled and sintered to a voids volume of 85 percent and a thickness of 0.04 inch.

Figure 8:
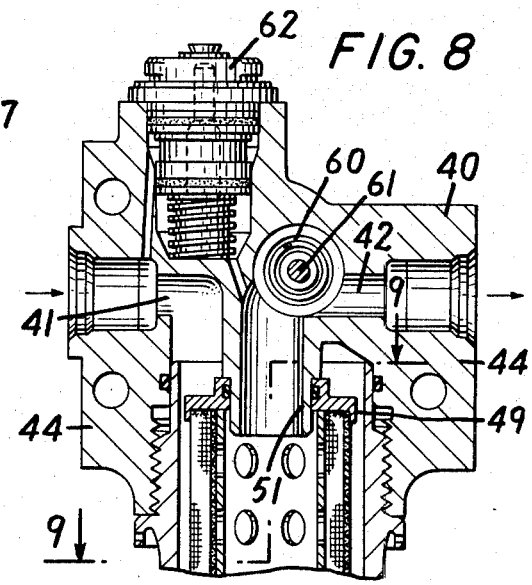
FIG. 8 represents a longitudinal sectional view of a filter unit and filter element incorporating a knitted mesh composite of FIG. 1.
Figure 9:
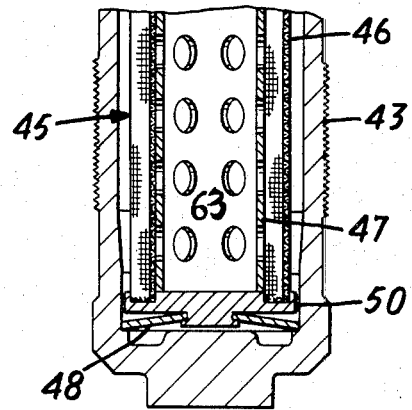
FIG. 9 represents a cross-section taken along the lines 9—9 of FIG. 8.

This composite can be cut into disks, and it can also be corrugated into a sheet having a plurality of corrugation folds. Such a sheet can be made into a cylindrical filter element, as shown in FIGS. 8 and 9, for example.

Figure 3:
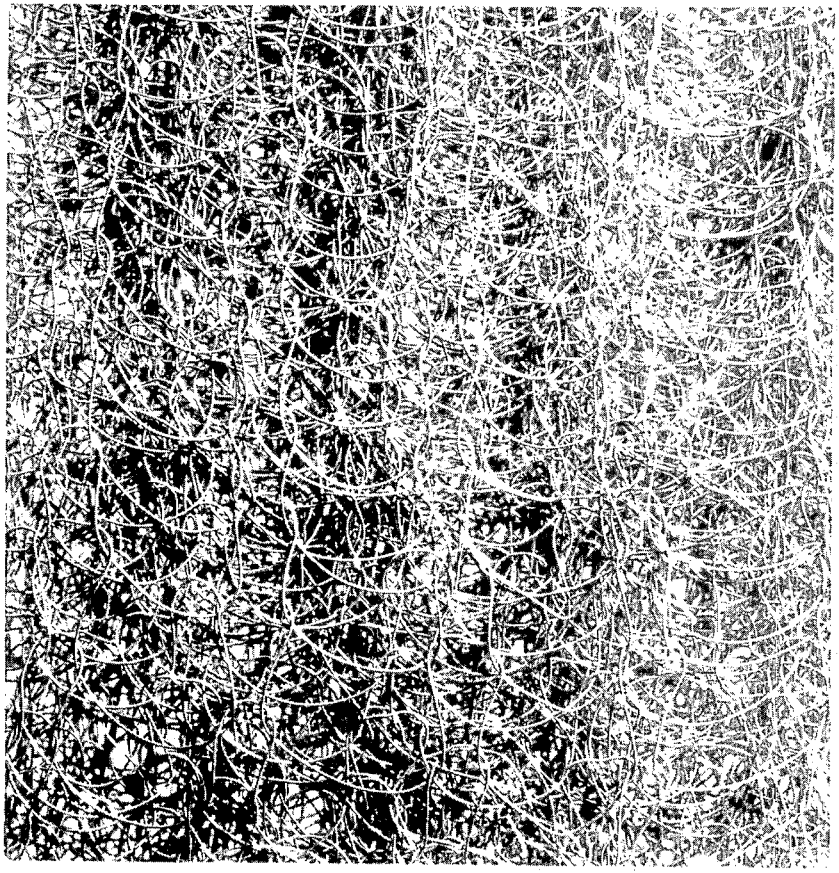
FIG. 3 is a photographic top view enlarged six times of a loose-weft-knitted mesh stack, ready for compressing and bonding to form a composite of the invention.

FIG. 3 shows photographically, enlarged six times, a stack of sixteen layers of loose-weft-knitted mesh, of 0.004 inch diameter wire, ready for rolling and sintering. The looped wires of the mesh retain their knitted identity quite clearly.

Figure 3A:
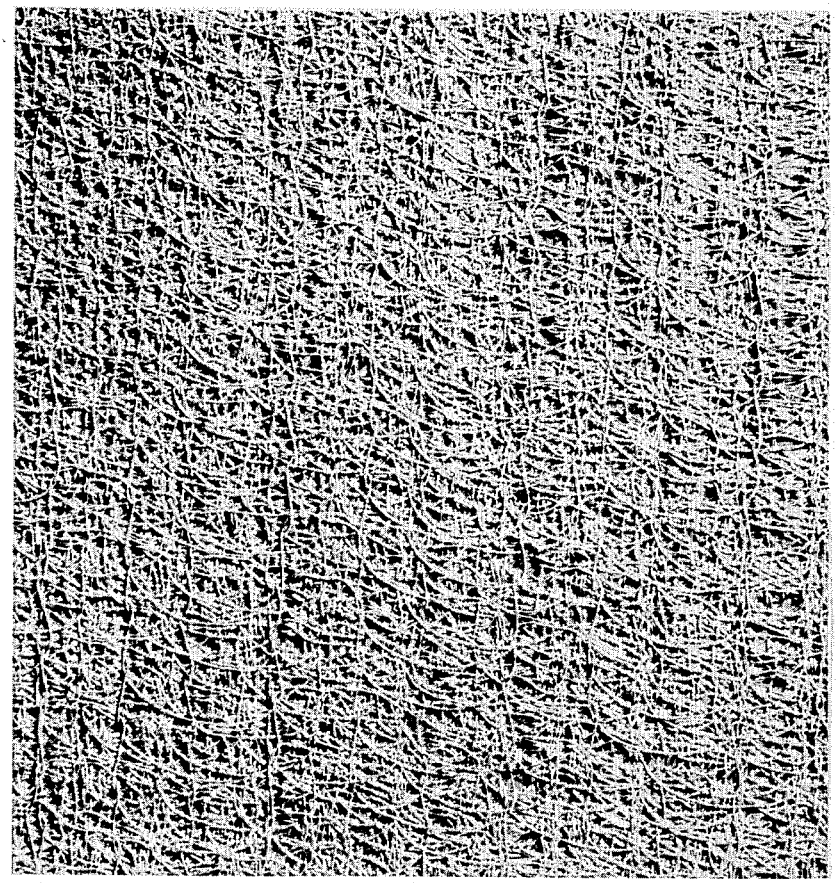
FIG. 3A is a photographic top view enlarged six times of a weft-knitted mesh composite of the invention, made from the mesh stack of FIG. 3.
Figure 3B:
FIG. 3B is a photographic end view of the composite of FIG. 3A.

FIG. 3A shows photographically, enlarged six times, the same stack after rolling and sintering. The knitted pattern is still evident, but the consolidation of the mesh has resulted in a considerable reduction in the size of the mesh openings. The end view 3B shows that the consolidation has in fact resulted in a sheet that is plate-like in character, with a smooth surface. The porosity is anisometric, with many through pores extending across the sheet, and few through pores extending laterally.

Figure 4A:
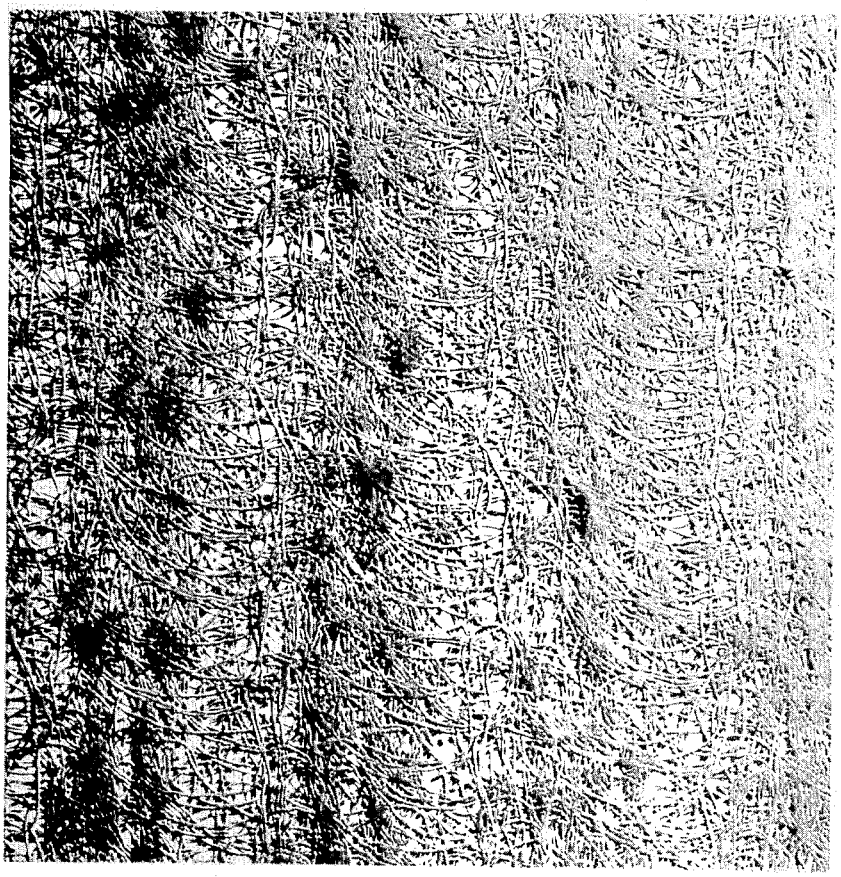
FIG. 4A is a photographic top view enlarged six times of another knitted mesh composite of the invention.
Figure 4B:
FIG. 4B is a photographic end view of the composite of FIG. 4.

FIG. 4A shows photographically, enlarged six times, another sintered and rolled composite, made of ten layers of the loose-weft-knitted mesh of FIG. 3. The composite is more open, and the pore size and voids volume are greater, partly because the number of layers is less, and partly because of a lower pressure and less percent reduction in thickness during the rolling and sintering operation. Nonetheless, as FIG. 4B shows, the sheet is platelike in character, and anisometric in porosity, the porosity laterally being lower than that across the sheet.

Figure 5:
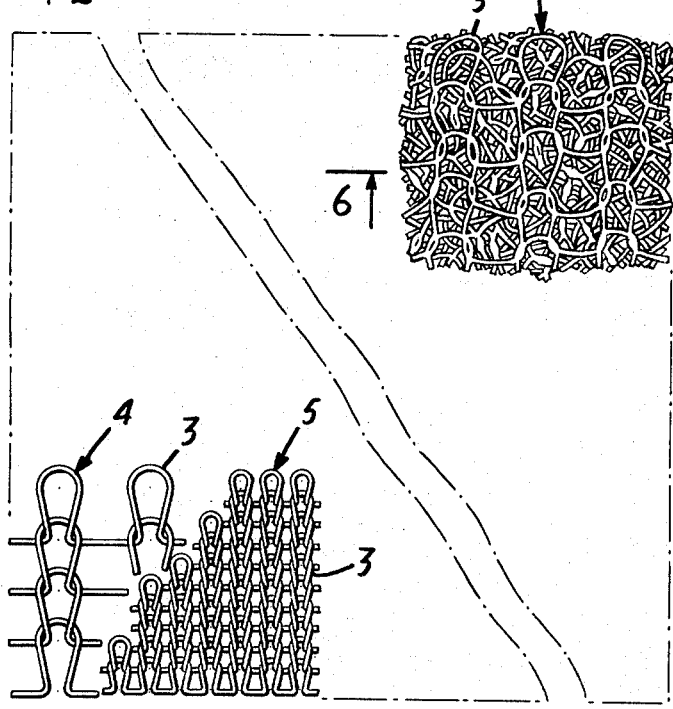
FIG. 5 is a plan view (with the top layer partly broken away) of a tubular loose-weft-knitted mesh composite made of mesh of different needle ends, showing the starting mesh in one part and the composite in another part.
Figure 6:
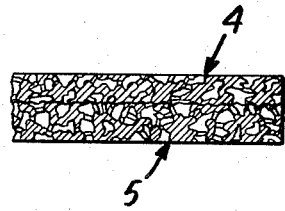
FIG. 6 is a view in transverse section, taken on the line 6—6 of FIG. 5, looking in the direction of the arrows.

FIGS. 5 and 6 show another anisometric knitted wire mesh composite, made up of 30 layers of knitted mesh sheet. The first 15 are of a loose-knit weft type stainless steel knitted mesh 4, 12 needle ends per inch, and the second 15 are of a loose-knit-weft type stainless steel mesh 5, 18 needle ends per inch. Both knitted mesh are made of 2 mil wire 3. The difference in needle ends of the two mesh produces a composite having coarse 50 microns average pores on the upper side (shown in FIG. 6) and fine 10 microns average pores on the lower side.

Figure 7:
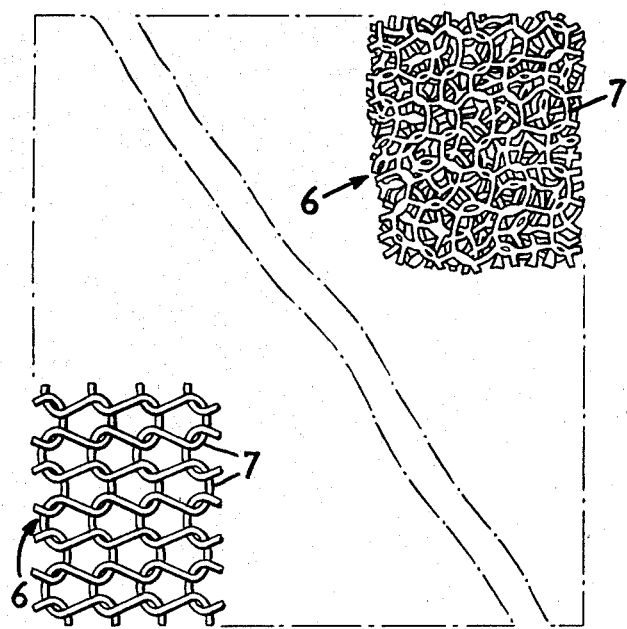
FIG. 7 is a plan view of a flat close-weft-knitted mesh composite, showing the starting mesh in one part and the composite in another part.

FIG. 7 shows an anisometric knitted wire mesh composite made of five layers 6 of close-knit weft type stainless steel knitted mesh, made of 10 mil wire 7.

Figure 21:
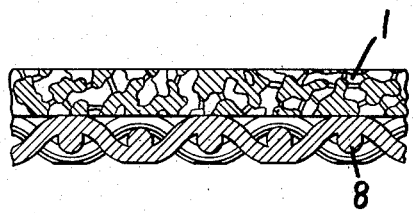
FIG. 21 is a cross-sectional view of a knitted mesh composite of the invention sinter-bonded to a woven wire mesh.

FIG. 21 shows a knitted wire mesh composite 1 of the invention, as shown, for instance, that of FIGS. 1 and 2, sinter-bonded to a sintered square weave stainless steel wire mesh 8.

Figure 22:
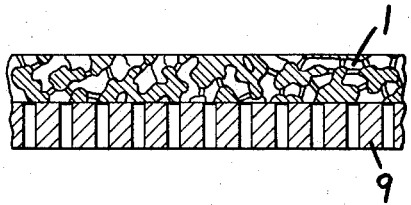
FIG. 22 is a cross-sectional view of a knitted mesh composite of the invention sinter-bonded to a perforated metal plate.

FIG. 22 shows a similar multilayer structure, in which the knitted wire mesh composite 1 is sinter-bonded to a perforated stainless steel plate 9.

Figure 23:
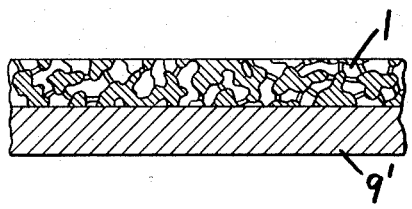
FIG. 23 is a cross-sectional view of a knitted mesh composite of the invention sinter-bonded to a metal plate.

FIG. 23 shows a similar multilayer structure in which the knitted wire mesh composite 1 is sinter-bonded to a solid stainless steel sheet 9'.

The voids volume of the anisometric knitted wire mesh composite is determined by measuring apparent volume and true volume. The apparent volume of the material is determined by measurement of its area and thickness. The true volume is determined by fluid displacement techniques, using a fluid capable of wetting the product. The voids volume is then determined by the following equation:

$$\text{Voids volume} = 100 \times \left[ 1 - \frac{\text{True volume of composite}}{\text{Apparent volume of composite}} \right]$$

Calculated by this method, the knitted wire mesh composites produced by means of this invention preferably have voids volumes of at least 50 percent and in some instances 80 percent and even higher.

The pore size or diameter of the knitted wire mesh composites of this invention is evaluated by the following test, which is substantially in accordance with the procedure of U.S. Pat. No. 3,007,334.

A disk of the material to be tested is wetted with a fluid, preferably ethyl alcohol, capable of wetting the porous material, and clamped between rubber gaskets. The volume above the disk is filled with the fluid. Air pressure is increased in the chamber below the disk until a stream of air bubbles is observed emerging from one point of the test piece. The effective pore diameter is then calculated by the well-known formula:

$$\text{Pore diameter (microns)} = \frac{K}{\text{Pressure (inches of water)}}$$

This formula is discussed in WADC Technical Report 56-249, dated May, 1956, entitled "Development of Filters for 400°F. and 600°F. Aircraft Hydraulic Systems" by David B. Pall, and available from the ASTIA Document Service Center, Knott Building, Dayton 2, Ohio. A detailed description of the bubble point test and determination of pore size from the maximum particle passed will be found in Appendix I of this report. See also U.S. Pat. No. 3,007,334, dated Nov. 7, 1961, to David B. Pall.

K is determined by measuring the maximum spherical glass bead or carbonyl iron particle which passes through the element, in accordance with WADC Technical Report 56-249 and MIL-F-8815B Paragraph 4.6.2.5 (Aug. 10, 1967).

The pore diameter obtained by this method is the maximum pore diameter. By continuing to increase air pressure until the whole surface of the filter medium is bubbling (known as the "open bubble point"), the same constant can be used to compute an average diameter characteristic of most of the pores. Tests have shown that if air is passed at a velocity of 70 to 170 cm/min, the pressure necessary to achieve the open bubble point taken together with the K value given above gives a value for the pore opening approximating the true average value. The ratio between the maximum pore size and the average pore size of the microporous media of this invention generally ranges from about 2:1 to about 4:1, a relatively small difference which greatly increases the safety and reliability of the product.

The following examples in the opinion of the inventors represent preferred embodiments of their invention.

EXAMPLE 1

Four anisometric knitted wire mesh compositions were prepared, made of 0.0011 inch diameter AISI 347 stainless steel wire, using a weft knit mesh that had from 12 to 18 needle ends per inch. Sixteen layers of this mesh were stacked at random orientation to make a composite, and sintered at 1,200°C. The composite was cut into four pieces which were rolled to thicknesses of 0.007 inch, 0.0045 inch, 0.003 inch and 0.002 inch, respectively. The four layers were stacked in that order, and resintered to make the final anisometric composite.

The dirt capacity of the final composite was determined in accordance with the following test procedure, which represents a modification of the procedure of Military Specification MIL-F-8815B. The composite described in the preceding paragraph was clamped in a flow jig fitted with gaskets 3½ inches OD and 3.06 inches ID, and connected to a pressure build-up and collapse pressure apparatus, as defined in Section 4.6.2.7 of MIL-F-8815B, Aug. 20, 1967. Hydraulic fluid conforming to Specification MIL-H-5606 was run through the mesh at a flow of 40 gpm/ft$^2$. Direction of flow was such that the upstream face of the test piece was the 0.007 inch (highest voids volume) face. Standardized fine air cleaner (A-C fine) test dust in a slurry was added through the dust valve in 0.2 gram increments at 4-minute intervals. The clean-up filter was not by-passed during this test. Two minutes after each test dust addition, the pressure differential at rated flow through the apparatus was recorded. The initial pressure drop was 0.2 psid., and the weight of contaminant added in the same manner to develop a differential pressure across the mesh of 15, 40 and 90 psid. was, respectively, 85, 91 and 97 grams/sq. ft. After cleaning the composites, a suspension of glass beads in oil was passed through them. The maximum bead passed was 62 microns. This is the maximum particle rating.

These data represent a very high dirt capacity, considerably higher than a woven wire mesh of equivalent maximum particle rating. For a 325 × 325 × 0.0014 stainless steel square weave wire mesh, of nominal opening 43 microns, and maximum particle rating 51 microns, the weights of contaminant (AC Test Dust) were 20, 24, and 26 g./sq.ft. for differential pressures of 15, 40, and 90 psig., respectively; for a 200 × 200 × 0.0021 stainless steel square weave wire mesh of nominal opening 74 microns and maximum particle rating 38 microns, the weights of contaminant were 56, 63, 68 g./sq.ft. to 15, 40 and 90 psig., respectively. These two woven meshes are industry standards for removal ratings in the range of 43 to 83 microns. Thus, the knitted wire mesh composite of the invention has a dirt capacity greater than that of woven wire mesh of comparable or somewhat larger pore size.

EXAMPLE 2

An anisometric knitted wire mesh composite was prepared, made of layers of 0.002 inch A151347 stainless steel wire weft knit mesh having from 12 to 18 needle ends per inch. Ten layers of this were stacked, annealed, rolled and sintered at 1,200°C. to a composite 0.006 inch thick. Twenty layers were stacked, annealed, rolled and sintered at 1,200°C. to a composite 0.008 inch thick. Ten layers were stacked, annealed, rolled and sintered at 1,200°C. to a composite 0.0023 inch thick. The three composites were then stacked in that order, and resintered to make the final anisometric composite.

The dirt capacity and maximum particle rating of this wire mesh composite were determined in accordance with the test procedure of Example 1. The weights of contaminant to 15, 40 and 90 psig. were 56, 60 and 78 grams/sq. ft., respectively.

The maximum particle rating was 71 microns.

EXAMPLE 3

An anisometric knitted wire mesh composite was prepared made from 64 layers of 0.0011 inch AISI 347 stainless steel wire weft knit mesh having 12 to 18 needle ends per inch, stacked, annealed, rolled and sintered at 1,200°C. to a composite 0.028 inch thick.

The dirt capacity and maximum particle rating of this composite were determined in accordance with Example 1, except that the flow was 50 g.p.m./sq. ft. The weights of contaminant to 15 40 and 90 psig. were 91, 107 and 120 g./sq.ft., respectively.

The maximum particle rating was 60 microns.

EXAMPLE 4

The procedure of Example 3 was repeated except that the final composite was rolled and sintered to a composite 0.018 inch thick.

The dirt capacity and maximum particle rating of this composite were determined in accordance with Example 3. The weights of contaminant to 15, 40 and 90 psig. were 64, 68 and 80 grams/ft$^2$, respectively.

The maximum particle rating was 31 microns.

EXAMPLE 5

The composites of Examples 3 and 4 were stacked and sintered at 1,200°C. The resultant composite was clamped in a flow jig as in Example 1 with the 0.028 inch thick portion upstream.

The dirt capacity and maximum particle rating of this composite was determined as in Example 3. The weights of contaminant to 15, 40 and 90 psig. were 81, 90 and 97 grams, respectively.

The maximum particle rating was 30 microns.

EXAMPLE 6 to 19

A number of anisometric knitted wire mesh composites were prepared, from weft knitted wire mesh made of AISI 347 stainless steel wire, 0.002, 0.003 or 0.004 inch in diameter, as noted in Table I. These were stacked, using the number of layers noted in the Table, sintered at 1,150° – 1,400°C., rolled to the thickness noted in the Table, and then resintered at 1,100° – 1,250°C. The bubble points and air flow at the pressure differential noted and the Rayl numbers were determined, and are listed. The Rayl number is a measure of flow resistance, and is discussed below.

TABLE I

| Example No. | Wire Diameter (inches) | No. of layers | Thickness (inches) | Bubble point (inches of water column) 1st | Bubble point 10th | Bubble point Open | ΔP (inches of water column) | At air flow (feet per second) | Weight (lbs./ft.²) | Rayl No. |
|---|---|---|---|---|---|---|---|---|---|---|
| 6 | 0.002 | 122 | 0.046 | 1.75 | 1.80 | 2.2 | 2.7 | 10 | 0.47 | 10 |
| 7 | 0.002 | 122 | 0.026 | 2.15 | 2.65 | 3.8 | 8 | 10 | 0.48 | 32 |
| 8 | 0.002 | 122 | 0.024 | 3.1 | 3.4 | 5.0 | 12 | 10 | 0.48 | 50 |
| 9 | 0.002 | 242 | 0.043 | 3.1 | 3.5 | 3.9 | 11.8 | 10 | 0.80 | 50 |
| 10 | 0.002 | 242 | 0.032 | 4.3 | 5.0 | 6.7 | *2.7 | 10 | 0.80 | 150 |
| 11 | 0.002 | 242 | 0.027 | 5.2 | 5.9 | 10.4 | *12 | 10 | 0.80 | 450 |
| 12 | 0.002 | 242 | 0.021 | 7.9 | 10.8 | 24.4 | *10 | 2.5 | 0.80 | 2,250 |
| 13 | 0.003 | 56 | 0.017 | 1.0 | 1.4 | 2.6 | 2.7 | 10 | 0.45 | 10 |
| 14 | 0.003 | 70 | 0.024 | 1.0 | 1.3 | 2.5 | 3 | 10 | 0.52 | 11 |
| 15 | 0.003 | 152 | 0.050 | 1.8 | 2.0 | 3.4 | 7.1 | 10 | 0.75 | 32 |
| 16 | 0.003 | 152 | 0.044 | 2.0 | 2.4 | 4.2 | 12.1 | 10 | 0.75 | 50 |
| 17 | 0.004 | 32 | 0.020 | 1.0 | 1.2 | 2.2 | 4.0 | 10 | 0.52 | 11.5 |
| 18 | 0.004 | 70 | 0.038 | 1.5 | 1.9 | 3.3 | 10.6 | 10 | 0.90 | 35 |
| 19 | 0.004 | 82 | 0.046 | 1.8 | 2.4 | 3.7 | 14.3 | 10 | 1.0 | 50 |

*Pounds per square inch.

The tensile breaking strength, specific strength (ratio of breaking strength to weight per unit area) and Young's Modulus were determined for several of the examples given in Table I. This data is given in Table II:

TABLE II

| Ex. No. | Tensile Breaking Strength, lbs/ft. | Specific Strength ft.* | Young's Modulus psi. |
|---|---|---|---|
| 6 | 3468 | 7332 | 4.2 × 10⁶ |
| 7 | 3432 | 7150 | 8.1 × 10⁶ |
| 8 | 3744 | 7800 | 10.2 × 10⁶ |
| 17 | 3564 | 6854 | 11.4 × 10⁶ |
| 18 | 7140 | 7933 | 12.5 × 10⁶ |
| 19 | 8820 | 8820 | 10.3 × 10⁶ |

*(lbs./ft.)/lbs./sq. ft.)

For comparison with Examples 1 to 19, similar data is given in Table III for a number of sintered woven wire mesh sheets of comparable weights and pore size, made of the same stainless steel, AISI 347, as these examples.

TABLE III

| Woven mesh Sample | Type weave | Weight (lbs./sq. ft.) | Breaking strength (lbs./ft.) | Rayl No. | Specific strength (ft.) | Young's modulus (p,s,i,) |
|---|---|---|---|---|---|---|
| A | Sintered dutch twill | 0.46 | 2,232, *2,760 | 10 | 4,852, *6,000 | 1.3×10⁶ |
| B | do | 0.70 | 3,744 | 34 | 5,349 | 4.6×10⁶ |
| C | Sintered square weave | 0.60 | 3,120 | 35 | 5,200 | 4.9×20⁶ |
| D | do | 0.60 | 3,360 | 50 | 5,600 | 5.3×10⁶ |

*Directional properties.

It will be noted that all the above data is for material which has been resintered, thus at least partially annealing the mesh, and the variation in specific strength is not very large. This indicates that, for any alloy, the breaking strength is about proportional to the weight of material used, with the amount of compression performed on the material having at most a small effect.

These anisometric materials were satisfactory as filters for air and for liquids, and as acoustic absorption media.

EXAMPLES 20 to 32

A number of anisometric knitted wire mesh composites were prepared, from weft knitted wire mesh made of AISI 347 stainless steel wire, 0.002, 0.003, and 0.004 inch in diameter, as noted in Table IV. These were stacked, using the number of layers noted in the Table, sintered at 1,150° – 1,400°C., rolled to the thickness noted in the Table (0.01 to 0.05 inch), resintered at 1,100° – 1,250°C., and the Rayl number and tensile strength determined.

TABLE IV

| Example No. | Wire diameter (inch) | Weight (lbs./sq. ft.) | No. of layers | Rayl No. | Actual thickness (inch) |
|---|---|---|---|---|---|
| 20 | 0.004 | 0.47 | 24 | 10 | 0.0125 |
| 21 | 0.003 | 0.75 | 112 | 59 | 0.031 |
| 22 | 0.003 | 0.58 | 94 | 43 | 0.0245 |
| 23 | 0.004 | 1.0 | 82 | 32 | 0.0485 |
| 24 | 0.004 | 0.85 | 66 | 50 | 0.0325 |
| 25 | 0.004 | 0.72 | 52 | 45 | 0.0235 |
| 26 | 0.004 | 0.61 | 44 | 44 | 0.0215 |
| 27 | 0.004 | 0.53 | 40 | 35 | 0.0175 |
| 28 | 0.004 | 0.63 | 50 | 32 | 0.0245 |
| 29 | 0.004 | 0.75 | 60 | 38 | 0.029 |
| 30 | 0.002 | 0.65 | 212 | 32 | 0.0425 |
| 31 | 0.002 | 0.65 | 212 | 50 | 0.036 |
| 32 | 0.002 | 0.80 | 242 | 32 | 0.048 |

EXAMPLES 33 to 35

For applications requiring high strength, the resintering step can be omitted, so that the knitted mesh composite remains in a work-hardened condition, or heat treatable materials can be used. Example 33 is an instance of the former approach, Examples 34 and 35 the latter. These composites were prepared from weft-knitted wire mesh made of the steel alloy noted in Table V, stacked using the number of sheets noted in the table, sintered at 1,150°–1,400°C., and rolled to the thickness noted in the table. Examples 34 and 35 were resintered at 1,100°–1,250°C., and heat treated for maximum strength following manufacturer's published recommendations. The Rayl number, breaking strength and specific strength were then determined for all the examples.

TABLE V

| Example No. | Alloy | Wire diameter (inches) | No. of layers | Resintered | Heat-treated | Weight (lbs./ft.²) | Rayl No. | Actual thickness (inches) | Breaking strength (lbs./ft.) | Specific strength (ft.) |
|---|---|---|---|---|---|---|---|---|---|---|
| 33 | AISI 347 | 0.004 | 20 | No | No | 0.28 | 7 | 0.012 | 3396 | 12,120 |
| 34 | AM 355 | 0.004 | 20 | Yes | Yes | 0.26 | 10 | 0.008 | 3912 | 15,100 |
| 35 | Armco 17-4PH | 0.004 | 20 | Yes | Yes | 0.27 | 8 | 0.010 | 3660 | 13,540 |

These materials were quite satisfactory as filters, and as acoustic absorption media.

It is quite remarkable that at a given Rayl Number and weight, the composites of the invention (compare Tables II and III) are stronger in breaking strength and specific strength than a woven wire fabric, and have a higher modulus of elasticity. This means that the acoustic insulation or other acoustic unit can be smaller and lighter, for equivalent effectiveness. This is a particularly useful advantage in aircraft, missile and submarine applications.

EXAMPLES 36 to 39

It is also remarkable that the knitted mesh composites provide more uniform permeability over the face of a composite than woven wire mesh of comparable nominal permeability. Four knit mesh composites and four woven wire mesh sheets were checked for Rayl number, 16 places each on sheets 18 × 48 inches in size. Results are given in Table VI.

TABLE VI

| Example No. | Type | Average Rayl No. | Variation | % Variation |
|---|---|---|---|---|
| 36 | Knitted | 10 | ± 0.8 .3 | 3.0 |
| Control E | Woven | 13 | ± 1 | 7.7 |
| 37 | Knitted | 20 | ± 1 | 5.0 |
| Control F | Woven | 27.5 | ± 2.5 | 9.1 |
| 38 | Knitted | 31 | ± 2 | 6.5 |
| Control G | Woven | 34 | + 6 / − 3 | +17.6 / − 8.8 |
| 39 | Knitted | 50 | ± 3 | 6 |
| Control H | Woven | 50 | ± 8 | 16 |

In all cases, the percentage variation for the knitted wire mesh composites was lower than for the woven mesh, ranging from 3 to 6.5 percent for the knitted mesh composites as against 7.7 to 17.6 percent for the woven mesh.

EXAMPLE 40

An anisometric knitted wire mesh composite was prepared made from 122 layers of 0.002 inch AISI 347 stainless steel wire weft knit mesh having from 12 to 18 needle ends per inch. These layers were stacked on top of a perforated AISI 304 stainless sheet having 0.028 diameter holes on 0.063 inch centers in an equilateral triangular pattern, sintered at 1,200°C., rolled, and sintered again. The final composite had a permeability of 50 Rayls, a weight of 1.1 lbs/ft.$^2$, a Young's modulus of $13 \times 10^6$ psi., a breaking strength of 12,240 lbs/ft. and a specific strength of 11.12 ft.

By using perforated sheet made of high strength alloys, for example, the precipitation hardening alloys such as 17-7 PH, 17-4 PH, AM 350, AM 355, etc., bonded to lower or higher yield strength knitted wire mesh composites, even better mechanical properties can be obtained.

Some high strength alloys are not readily available, or are very expensive, when made as fine wire. By combining perforated material made of very high strength alloys with knitted mesh composites made of readily available wire, a high strength product is obtained at low cost.

EXAMPLE 41

A honeycomb structure comprising two knitted mesh composites of the invention was prepared. Two knitted mesh composites were prepared, one in accordance with Example 18 and one in accordance with Example 19. A commercially available welded stainless steel honeycomb core made of 0.004 stainless steel foil, seven-sixteenths inch thick with three-eighths inch cells, was placed between the two composites, and the sandwich sintered at 1200°C. between two flat plates. Adhesion of the facing sheets to the core was found to be satisfactory, and no measurable loss in porosity of the knit mesh facing sheets was observed. The resultant structure was suitable for sound suppression and structural use.

EXAMPLES 42 to 46

Honeycomb structures were made following the procedure of Example 41, except that only one face was a knit mesh composite. Table VI lists the structures used.

TABLE VII

| Example No. | Knitted Mesh Face per Example | Other Face |
|---|---|---|
| 42 | 6 | 0.003 inch solid stainless steel sheet |
| 43 | 6 | 0.003 inch perforated stainless steel sheet, 0.020 inch holes staggered, 23% open area |
| 44 | 7 | 0.003 inch perforated stainless steel sheet, 0.020 inch holes staggered, 23% open area |
| 45 | 8 | Sintered woven wire mesh, 58 Rayls, 0.017 inch thick, 0.24 lbs/ft². |
| 46 | 20 | Sintered woven wire mesh, 13 Rayls, 0.017 inch thick, 0.22 lbs/ft². |

All structures showed good adhesion, no measurable reduction in porosity in the knitted mesh composite face, and were suitable for use in sound suppression applications carrying structural loads.

The anisometric wire mesh composites of the invention are especially suited for use as liquid filter elements because of their disproportionately high flow crosswise of the sheet, their unusually high dirt capacity, low flow resistance, and particle removal rating, and their high strength. A typical filter unit including an anisometric knitted wire mesh composite of the invention as the filter element is shown in FIGS. 8 and 9.

The filter unit of FIGS. 8 and 9 comprises a filter housing or head 40 having an inlet passage 41 and an outlet passage 42, opening into a filter bowl 43 which is threadably attached to a dependent portion 44 of the head. Disposed in the bowl 43 in a manner to intercept liquid flow from the inlet 41 to the outlet 42 through the bowl 43 is a filter element 45 composed of a corrugated cylinder of an anisometric knitted stainless steel wire mesh composite 46 of the invention, and an internal supporting core 47 held between top and bottom end caps 49 and 50, respectively. The top end cap 49 with the biasing action of Belleville spring 48 at the bottom of bowl 43, engages the dependent wall 51 of outlet 42 in a leakproof seal, so that all liquid entering the bowl 43 from inlet 41 can leave the bowl only by passing through the filter element 45.

A by-pass line 60 is provided, with a relief valve 61 arranged to open at a predetermined pressure differential between inlet and outlet passages 41 and 42, to ensure continued liquid flow in the event of clogging of the filter element.

A pressure indicator 62 is provided, also responsive to a predetermined pressure differential between the inlet and outlet passages to indicate a clogged condition of the filter.

Thus, liquid in normal flow enters the head 40 via inlet 41, passes into bowl 43 outside the filter mesh 46, passes through the mesh and core 47 into the open space 63 enclosed thereby, and emerges as filtered flow via outlet 42.

As the filter mesh 46 becomes clogged by the suspended contaminants removed thereby, the pressure differential thereacross rises, and eventually reaches the predetermined value at which the pressure indicator 62 is actuated to show the clogged condition, and the by-pass valve 51 is opened to ensure a continuing supply of liquid to the outlet 42. The filter unit can then be taken out of service, the bowl removed and the filter element replaced.

The filter element as shown is cylindrical, but any closed form can be used, as well as flat sheets. It can be supplied with any type of fitting, to secure it in the housing of the filter unit in a manner to ensure that all liquid flow passes through the filter. It is usually preferable to corrugate or fold the composite filter sheet, to provide maximum surface area in a small space.

Other variations will be apparent to those skilled in the filter art.

Figure 10:
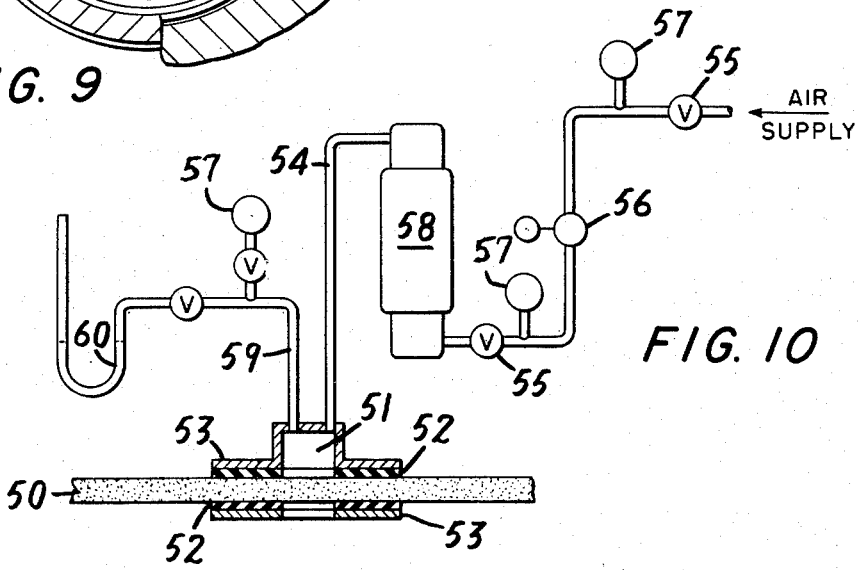
FIG. 10 shows the apparatus used to determine Rayl number (gas permeability) of a knitted wire mesh composite of the invention.

The acoustic insulating structures of the invention comprise a frame arranged along a passage for gas flow including laterally extending chambers disposed behind a knitted mesh composite of the invention. For each sound wave of a specific frequency there is an optimum chamber volume, to produce maximum sound attenuation. There also is an optimum value for the effective resistance of the anisometric knitted wire mesh composite at the entrance of the chamber. Each chamber and the knitted wire mesh composite at its entrance form a Helmholtz resonator, whose acoustic impedance is equal to $$R + j\left(\omega M - \frac{1}{\omega C}\right)$$

where
$R$ = flow resistance of the mesh composite
$M$ = inductive reactance of the mesh composite
$C$ = capacitance of chamber volume = $(\rho c^2/V)$
$j = \sqrt{-1}$
$\rho$ = *gas density*
$c$ = speed of sound
$V$ = chamber volume
$\omega$ = frequency, rad/sec. = $2\pi f$ The flow resistance R is normally expressed in Rayls. The Rayl number is determined by installing the knitted wire mesh composite in the test apparatus shown in FIG. 10. The knitted wire mesh composite 50 is attached across the open end of a plenum chamber 51, sealed against leakage by the rubber gaskets 52, in the jig 53. The plenum chamber is fitted with an air inlet line 54, connected to an air supply (not shown), with control valves 55, two pressure gauges 57, a pressure regulator 56, and a flow meter 58. Another line 59 leads from the plenum chamber to a manometer 60.

The Rayl number is determined by the equation:

$$R = \frac{\Delta P}{Q/\pi r^2}$$

where
$\Delta P$ = pressure drop, dyne/cm$^2$
$r$ = jig radius, cm.
$Q$ = air flow, cm$^3$/sec.

Figure 11:
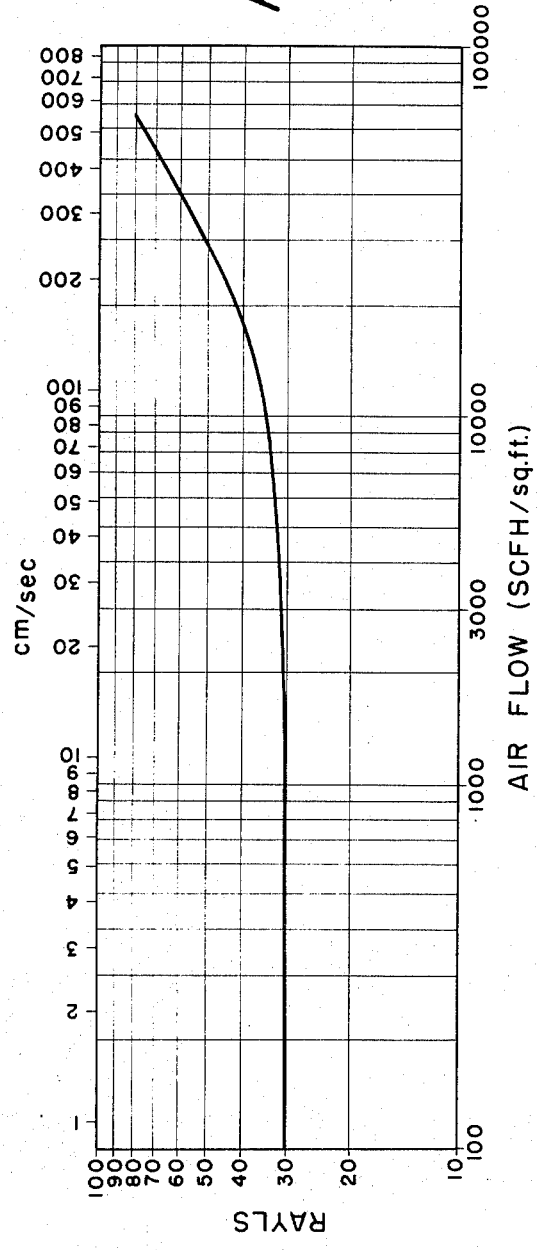
FIG. 11 is a graph of air flow (standard cubic feet per hour per square foot) against Rayl number for a knitted wire mesh composite of the invention.

The Rayl number depends on the air flow rate used for the test, as shown in the curve of FIG. 11. Since high noise levels correspond to high air flows (60,000 ft/hr. corresponds to approximately 160.5 db which is typical of aircraft engine noise levels), the Rayl number should be measured at the sound intensity at which the knitted wire mesh composite will be used.

Figure 12:
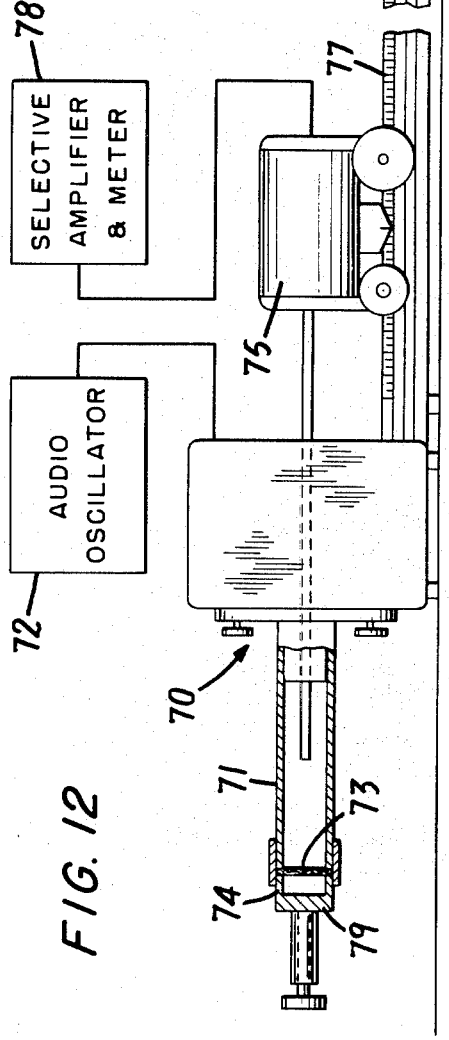
FIG. 12 shows an apparatus for determining the normal incidence absorption coefficient and inductive reactance of a knitted wire mesh composite of the invention.

The normal incidence absorption coefficient and inductive reactance of the anisometric knitted wire mesh composite can be determined by testing in a standing wave tube apparatus, as shown in FIG. 12. The loudspeaker 70 at one end of the tube 17 is operated at the desired test frequency from an audio-frequency oscillator 72. The sound waves move through the tube 71 and strike the sample 73 of knitted wire mesh composite which is placed in a sample holder 74, which provides the desired volume behind the sample. The sound waves are then partly reflected from the sample of knitted wire mesh composite. The resultant of an incident wave with amplitude 1 and reflected wave with amplitude $r$ is a standing wave pattern with alternate sound maxima $1 + r$ and minimal $1 - r$ in the tube 71. From the ratio $n$ of these sound pressure maxima and minimal the reflection coefficient $r$ follows directly.

$$r = (n-1/n+1)$$

The absorption coefficient $\alpha$ is the ratio of the energy absorbed by the sample of knitted wire mesh composite to the incident energy. In other words $\alpha = 1 - |r|^2$, from which, with the aid of the above equation, we find:

$$\alpha = \frac{4}{n + \frac{1}{n} + 2}$$

The sound field is explored by means of a probe microphone 75 movable on a track 76 equipped with a scale 77 on which the exact distance between probe entrance and test sample of knitted wire mesh composite can be read. The microphone voltage is amplified by a selective amplifier 78 to reduce the influence of hum and noise, and higher harmonics, which are inevitably generated by the loudspeaker in the tube.

Figure 13:
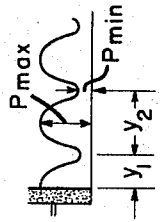
FIG. 13 is a graph of sound pressure against distance for the sample of knitted wire mesh composite.

FIG. 13 shows a typical curve of sound pressure vs. distance from the anisometric knitted wire mesh composite that is obtained using the apparatus of FIG. 12.

The distances $y_1$ and $y_2$ are measured and the phase angle $\theta$ of the reflection coefficient $r$ is calculated by $$\theta = \left(\frac{2y_1}{y_2} - 1\right)\pi$$

The impedance Z of the Helmholtz resonator is $$\frac{1+r}{1-r}\rho c = R + j\left(\omega M - \frac{1}{\omega C}\right)$$

where $r$ is a complex number. From this equation and the magnitude and phase angle of $r$, and knowing $\omega$ and C, R and M can be calculated.

Using the equations, it may readily be seen that, at resonance $$\omega M - \frac{1}{\omega C} = 0$$

$$\alpha = \frac{4\frac{R}{\rho c}}{\left(1+\frac{R}{\rho c}\right)^2}$$

which has a maximum at $R = \rho c$. Since $R$ varies with sound level, and the purpose of the knitted wire mesh composite is to reduce the sound level, it is desirable to have the flattest possible curve of $R$ vs. air flow. A resonator fitted with a sound absorption facing medium having a flat curve is efficient in absorbing sound at all sound levels, whereas use of a medium with a steep curve is efficient at one sound level only, hence overall sound attenuation is lower. To express the degree of deviation from this ideal, the Rayl Curvature Factor has been developed. This is the ratio of the Rayl number at 160.5 db (60,000 ft/hr) to 134.5 db (3,000 ft/hr). The lower the Rayl Curvature Factor, the closer to ideal the composite is.

The above description applies to normal incidence sound absorption, where the theory is well known. When ducts are lined with Helmholtz resonators so as to provide grazing incidence, with high air velocities and the spinning modes described by Tyler and Sofrin in U.S. Pat. No. 3,198,487, the theory is less well understood. This is probably because the impedance of the resonator is changed by the boundary layer in the flowing stream. However, it has generally been found that knitted wire mesh composites giving better performance in normal incidence tests will perform better in duct tests, with the exception that lower Rayl numbers are generally required because of the added impedance of the boundary layer.

Figure 14:
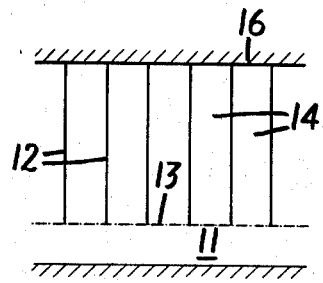
FIG. 14 is a cross-sectional view showing a gas duct with a honeycomb acoustic insulation structure incorporating as the front face a knitted mesh composite of the invention.

Accordingly, FIG. 14 shows in cross-section a duct 11, one wall of which is lined by a honeycomb structure composed of a front face plate of an anisometric knitted wire mesh composite 13 of the invention, in this case, the composite of Example 7, the honeycomb core, composed of cells 14, separated by dividers 12, and a solid back plate 16. The dividers separate the cells 14 from each other, but they can also allow interconnection. Best results are usually obtained if no interconnection is provided. The anisotropic character of the knit mesh composite is useful here, since side flow through the composite which would provide some interconnection between cells is substantially eliminated. The dividers 12 may be metal ribs or partitions, or a honeycomb core of resin impregnated paper or metal to which the knitted wire mesh composite 13 and plate 16 are fastened by riveting, sintering, welding, brazing, resin-bonding, or the like. If the dividers 12 are metal and fastening method is sufficiently strong, the resultant structure may be useful as an aircraft structural member, in addition to reducing moise.

The exact Rayl number of the knitted wire mesh composite, volume depth and volume, and the total area required, are best determined empirically for the desired installation.

Figure 15:
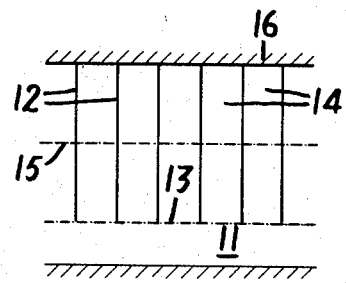
FIG. 15 is a cross-sectional view showing a gas duct with another embodiment of honeycomb acoustic insulation structure, including the knitted mesh composite of the invention.

The resultant installation will have a certain frequency range over which it will provide useful sound absorption. This range can be increased by the double honeycomb structure shown in FIG. 15. An additional internal divider of anisometric knitted wire mesh composite 15 divides the honeycomb into two preferably unequal honeycomb layers. If properly proportioned, this structure provides two resonant frequencies, and attenuates sound over a wider band width than the structure shown in FIG. 14.

Figure 16:
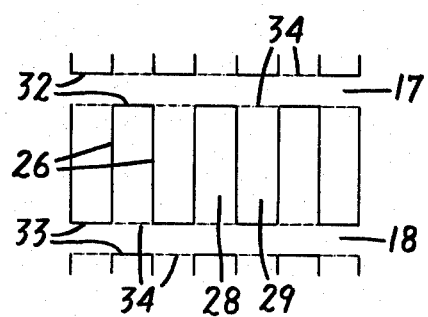
FIG. 16 is a cross-sectional view showing a gas duct with another embodiment of acoustic insulation structure, including the knitted mesh composite of the invention.
Figure 18:
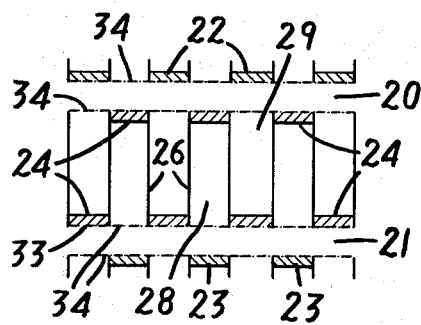
FIG. 18 is a cross-sectional view showing a gas duct with another embodiment of acoustic insulation structure, including the knitted mesh composite of the invention.

FIGS. 16 and 18 show configurations with an undulating divider 26 alternatingly serving as one face and then the other face of the structure, defining the closed cells 28, 29 behind the anisometric knitted wire mesh composite faces 34, opening first on one side and then on the other of the structure, particularly useful when a splitter (i.e., a member with flow on both sides) is to be acoustically treated. Of course, two structures as per FIGS. 14 or 15 can also be put back to back, to achieve the same effect, but more space is then necessary for the insulation.

The structure of FIG. 16 is arranged between two parallel passages 17 and 18. The core comprises cells 28, 29 separated by the undulating divider 26. The cells 29 are closed at their ends 33 adjacent the passage 18, and the cells 28 at the ends 33 adjacent the other passage 17. The other ends of cells 28, 29 are faced with the knitted mesh composites 34, which allow the passage of sound into the cells 28, 29. The sound is attenuated in this way in both passages 17, 18 with a single structure.

Figure 17:
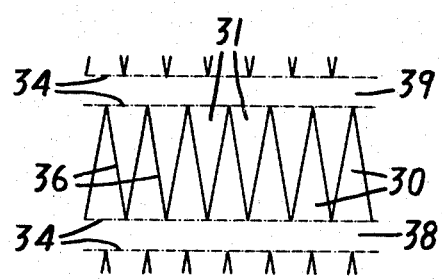
FIG. 17 is a cross-sectional view showing a gas duct with another embodiment of acoustic insulation structure, including the knitted mesh composite of the invention.

It is also possible to position the transverse walls of the structure in pairs of angles to one another, to form wedge-shaped cells, as in FIG. 17, the cells narrowing (converging) or widening (diverging) away from the passage, opening all on one passage, or on opposite sides, as in FIG. 17. If they open only on one passage, the diverging cells can be tuned to lower frequencies than the converging cells.

A simple zig-zag divider will create the wedge-shaped chambers.

In the form shown in FIG. 17, the transverse divider walls 37 of the structure are made of a single zig-zag sheet touching, alternately, the opposed knitted mesh composite faces 34, so that the cells 30, 31 are always closed at the points of the triangle against the penetration of sound, and at the base of the triangle are connected by the sound-conducting knitted mesh composites 34 (represented in broken lines) to the respective passage 38 or 39. The devices according to FIGS. 16 and 17 are also suitable for absorption-type acoustic insulation devices wherein the cells 28, 29 and 30, 31 are uniformly filled with loose absorbing material.

FIG. 18 shows a structure similar to FIG. 16, with the cells 28, 29 opening into passages 20, 21, alternately, with knitted mesh composites 34 permitting access to the cells, but with the sound-impermeable end walls 22, 23 lined with sound-absorbing material 24.

Figure 19:
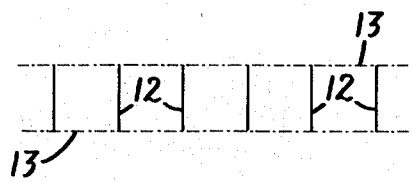
FIG. 19 is a cross-sectional view of another embodiment of acoustic insulation in honeycomb form, including two faces of knitted mesh composite of the invention.

FIG. 19 shows a honeycomb structure that is permeable to sound at each face, having each face 13 of knitted wire mesh composite, and the honeycomb core having traverse divider walls 12 extending therebetween.

Figure 20:
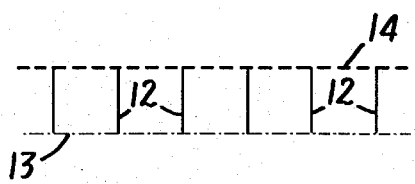
FIG. 20 is a cross-sectional view of another embodiment of acoustic insulation in honeycomb form, with one face of knitted mesh composite and one face of a perforated plate.

FIG. 20 shows a honeycomb structure like that of FIG. 19 with one face 13 of knitted wire mesh composite and one face 19 of a perforated metal plate.

Acoustic insulating structures of these types are useful to attenuate jet engine noise when used to line the fan ducts, engine intake ducts and exhaust ducts of jet engines. They are also useful in attenuating sound when used as a lining for ventilating ducts for air-conditioning and temperature conditioning systems.

The anisometric knitted wire mesh composites can serve as acoustic liners for gas ducts by merely disposing cylinders (round, polygonal or other shape) thereof in the duct, concentrically or eccentrically, and singly or in groups of two or more. The cylinders are so placed that gas flows along their surface and/or therewithin, in flowing through the duct. Why such an arrangement is effective in sound attenuation is not clear, but evidently the open voids volume of the composite acts as a plurality of lateral passages with the surface pores acting as the openings thereinto.

The high temperature strength and controlled anisometric porosity and thickness of the knitted mesh composites of the invention suit them admirably for jet engine afterburner and combustion chamber liners permitting passage of cool air to the inner surface, thus maintaining a cool layer of gas between the hot combusted gases and the containing wall surface. This allows jet engines to operate at higher temperatures without loss of chamber wall strength. This function is called transpiration cooling.

Other important applications are in turbine blades and in the fuel injection system of rocket engines. It has been shown that due to the very high thermal conductivity of hydrogen, the heat from the combustion chamber of a rocket engine can be transmitted to the hydrogen injection nozzles, causing them to melt. Using transpiration cooling via an anisometric knitted mesh composite of the invention and cryogenic hydrogen, this difficulty can be avoided. Other related applications are:

a. Use of porous media as an infra-red source by heating the porous structure to over 2,000°F. A typical application would be for stove type radiators.
b. Combustion chamber liners for helicopter blade tips, such as a small porous combustion chamber liner for use in helicopter blade tip jet burners to prevent overheating.
c. Infra-red shielding to cool surfaces below 600°F. to prevent infra-red radiation.
d. Supersonic and hypersonic wind tunnel nozzles.
e. Transpiration cooling of hypersonic aircraft, re-entry and aerospace craft.

Having regard to the foregoing disclosure, the following is claimed as the inventive and patentable embodiments thereof:

1. A fluid-permeable anisometric knitted wire mesh composite of integrated multilayer structure, capable of removing small particles from fluids, and/or of serving as an acoustic attenuator, comprising a plurality of layers of knitted wire mesh, compressed substantially throughout its surface area to a maximum pore diameter below and about 200 microns, and having the wires lying almost entirely in planes approximately parallel to the plane of the composite, having an anisometric porosity and a voids volume of at least 10 percent, the wires at the interface of the interior layers being intermingled and interlocked with each other substantially throughout by such compression, and the wires and the layers being bonded together at their points of contact.

2. A porous fluid-permeable composite as in claim 1, having a thickness within the range from about 0.001 to about 0.5 inch.

3. A porous fluid-permeable composite as in claim 1 wherein the wires within each layer and at the interface of the layers are sinter-bonded together.

4. A porous fluid-permeable anisometric composite as in claim 1, wherein said layers are of weft-type knitted mesh.

5. A porous fluid-permeable anisometric composite as in claim 1, wherein said layers are of warp-type knitted mesh.

6. A porous fluid-permeable anisometric composite as in claim 1, wherein the layers are of knitted mesh having less than 30 needle ends per inch.

7. A porous fluid-permeable anisometric composite as in claim 1, made of stainless steel wire.

8. A porous fluid-permeable anisometric composite as in claim 1, in which there are at least five layers of knitted wire mesh in one composite.

9. A porous fluid-permeable anisometric composite as in claim 1, wherein the wires are deformed at their points of crossing, so as to have a lesser height and a greater width at those points.

10. A porous fluid-permeable anisometric composite as in claim 1, having the wires sinter-bonded at their points of crossing.

11. A porous fluid-permeable anisometric composite as in claim 1, having a modulus of elasticity of at least 3.3 percent of the modulus of solid sheet of the same material.

12. A multilayer composite comprising a layer of a porous fluid-permeable anisometric composite as in claim 1 and a layer of a woven wire mesh, bonded thereto.

13. A multilayer composite comprising a layer of a porous fluid-permeable anisometric composite as in claim 1 and a layer of a perforated metal sheet, bonded thereto.

14. A multilayer composite comprising a layer of a porous fluid-permeable anisometric composite as in claim 1 and a layer of a nonporous metal sheet, bonded thereto.

* * * * *

PO-1050
(5/69)

UNITED STATES PATENT OFFICE
CERTIFICATE OF CORRECTION

Patent No. 3,690,606              Dated September 12, 1972

Inventor(s) David B. Pall

It is certified that error appears in the above-identified patent and that said Letters Patent are hereby corrected as shown below:

| | | |
|---|---|---|
| Columns 15 & 16, Table I, lines 4 & 5 | : | "Ray, Nol" should be -- Rayl No. -- |
| Columns 15 & 16, Table III, line 42 | : | "p,s,i," should be -- psi -- |
| Columns 15 & 16, Table III, line 44 | : | "4,6 x 10" should be -- $4.6 \times 10^6$ -- |
| Column 20, line 26 | : | "17" should be -- 71 -- |
| Column 20, line 36 | : | "minimal" should be -- minima -- |
| Column 20, line 38 | : | "minimal" should be -- minima -- |

Signed and sealed this 1st day of May 1973.

(SEAL)
Attest:

EDWARD M. FLETCHER, JR.
Attesting Officer

ROBERT GOTTSCHALK
Commissioner of Patents